No. 784,948. Patented March 14, 1905.

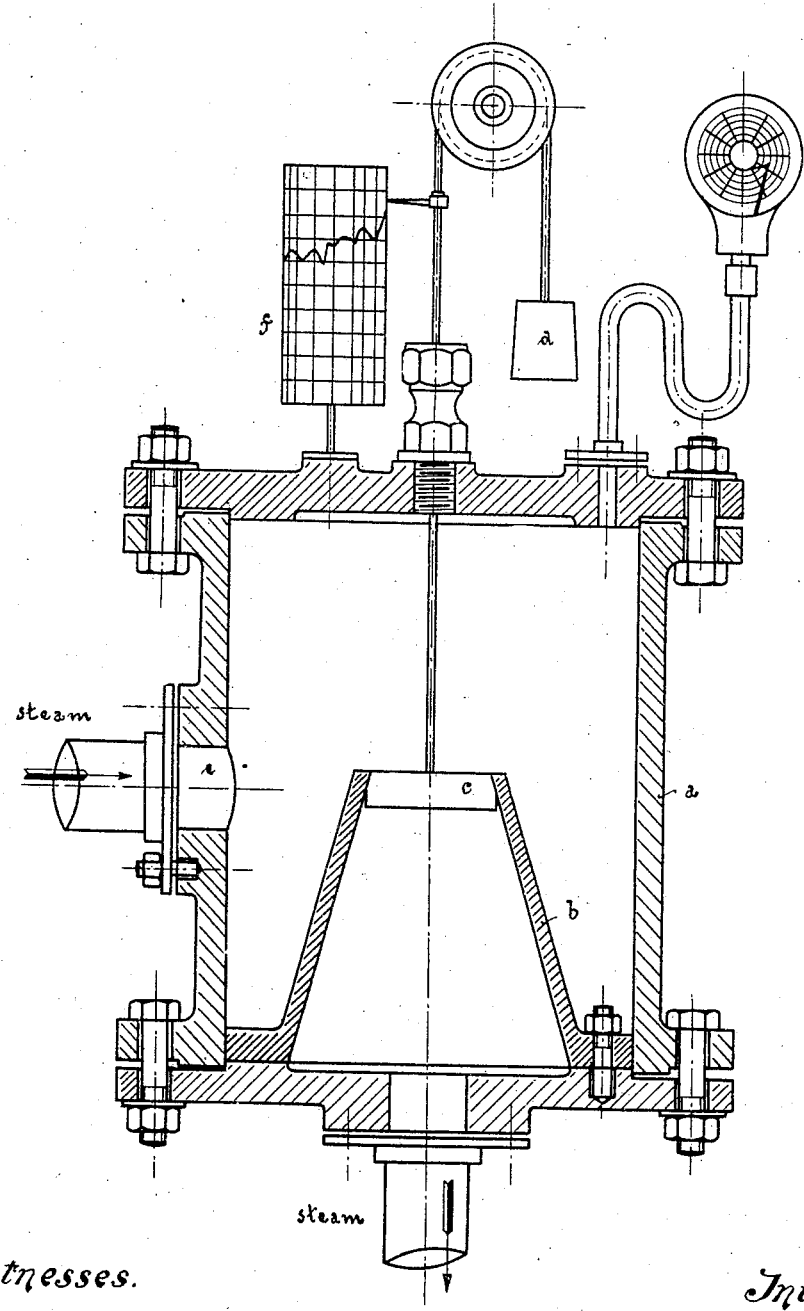

UNITED STATES PATENT OFFICE.

EMIL KUHNKE, OF LEVERKUSEN, NEAR COLOGNE, GERMANY, ASSIGNOR TO FARBENFABRIKEN OF ELBERFELD CO., OF NEW YORK, N. Y., A CORPORATION OF NEW YORK.

STEAM-METER.

SPECIFICATION forming part of Letters Patent No. 784,948, dated March 14, 1905.

Application filed July 2, 1903. Serial No. 164,069.

*To all whom it may concern:*

Be it known that I, EMIL KUHNKE, engineer, residing at Leverkusen, near Cologne, Germany, (assignor to the FARBENFABRIKEN OF ELBERFELD Co., of New York,) have invented a new and useful Improvement in Steam-Meters, of which the following is a specification.

My invention relates to a new steam-meter, being a device which accurately registers the amount of steam used in a given time.

In the accompanying drawing I have illustrated a vertical transverse section of one form of the meter, although other forms may also be used.

Referring to the drawing, $a$ designates a suitable casing provided with a manometer $g$; $b$, a hollow conical case wherein a loose contrivance for shutting this case—for instance, a bell—can be moved up and down. This bell is fastened to a wire led through the cover of the case $a$, over a pulley, and charged at its end with a weight $d$. The steam enters through the ingress-opening $e$ at one side of the casing and must pass the cone $b$ in order to reach the egress-opening. The bell therefore moves down and remains in the very position the cross-section of which corresponds to the steam consumption, while the velocity of the steam and the difference of steam-pressures before and behind the bell are kept constant by the weight $d$. If the pressure changes behind the bell, which means at the same time an alteration of steam consumption, the bell changes its position in order to reëstablish the former difference of pressures. It is the same case if the pressure changes before the bell. The positions of the bell $c$ corresponding to the existing steam consumptions are recorded by a pointer on a strip of paper $f$, moved by clockwork. The quantity of steam used and the length of time are thus rendered ascertainable. By means of these indications one can accurately determine the weight of steam flowing through the apparatus in a given time according to the following equation: $G = F u j$. G means the weight (kilograms) of steam flowing through the apparatus during one second. F means the cross-section of the steam-conduit expressed in square meters. $u$ means the velocity of the steam (expressed in meters) during one second. $j$ means the weight (kilograms) of one cubic meter of steam having the average pressure $p$. F can be determined by means of the indications on the strip of paper $f$. $u$ is for each pressure-constant. $j$ results from the steam-pressure, which can be determined with the aid of the manometer located on the casing $a$. In order to ascertain the steam consumption, it is only necessary to read off on the strip of paper $f$ the corresponding height of the bell $c$ and to determine the steam-pressure with the aid of the manometer. Thus the two numbers for the cross-section of the steam-conduit and for the weight of steam per one cubic meter are obtained. By a simple multiplication of these two numbers with each other and with the constant velocity of steam the steam consumption results for one second, expressed in kilograms. Of course one need not carry out this multiplication each time. One can register on a chart the indications of steam consumption at distinct steam-pressures corresponding to all possible positions of the bell $c$ and then read off in every moment the real steam consumption.

My meter will also measure other gases—for instance, compressed air or the like—on the same principle as it measures steam.

Having now described my invention and in what manner the same is to be performed, what I claim as new, and desire to secure by Letters Patent, is—

A steam-meter comprising a casing provided with an ingress at the side and an egress-opening at the bottom and with a manometer connected to its top, in combination with an open, hollow, conical case supported over the egress-opening, a bell movable in the interior of the conical case, a wire supporting the bell and passing over a pulley and supporting a weight at its free end, and a pointer connected to the wire, substantially as described.

In testimony whereof I have signed my name in the presence of two subscribing witnesses.

EMIL KUHNKE.

Witnesses:
OTTO KÖNIG,
J. A. RITTERSHAUS.